(12) United States Patent
Ichikawa et al.

(10) Patent No.: US 10,868,319 B2
(45) Date of Patent: Dec. 15, 2020

(54) AIR CLEANER FOR FUEL CELL VEHICLE

(71) Applicants: Toyota Jidosha Kabushiki Kaisha, Toyota (JP); Toyota Boshoku Kabushiki Kaisha, Kariya (JP)

(72) Inventors: Tetsuya Ichikawa, Toyota (JP); Kimiko Yoshida, Nagoya (JP); Jun Goto, Kariya (JP); Ryu Hirata, Obu (JP); Noriaki Miki, Kariya (JP)

(73) Assignees: Toyota Jidosha Kabushiki Kaisha, Toyota (JP); Toyota Boshoku Kabushiki Kaisha, Kariya (JP)

( * ) Notice: Subject to any disclaimer, the term of this patent is extended or adjusted under 35 U.S.C. 154(b) by 78 days.

(21) Appl. No.: 16/196,761

(22) Filed: Nov. 20, 2018

(65) Prior Publication Data
US 2019/0181479 A1 Jun. 13, 2019

(30) Foreign Application Priority Data
Dec. 13, 2017 (JP) .................................. 2017-238636

(51) Int. Cl.
*H01M 8/0662* (2016.01)
*B01D 46/00* (2006.01)
*B01D 53/04* (2006.01)

(52) U.S. Cl.
CPC ...... *H01M 8/0687* (2013.01); *B01D 46/0002* (2013.01); *B01D 46/0032* (2013.01); *B01D 46/0036* (2013.01); *B01D 53/0407* (2013.01); *B01D 2221/00* (2013.01); *B01D 2253/102* (2013.01); *B01D 2253/1124* (2013.01); *B01D 2256/16* (2013.01); *B01D 2257/302* (2013.01); *B01D 2257/404* (2013.01); *B01D 2257/406* (2013.01); *B01D 2279/60* (2013.01)

(58) Field of Classification Search
None
See application file for complete search history.

(56) References Cited

U.S. PATENT DOCUMENTS

2017/0239604 A1* 8/2017 Baek .................. B01D 39/1623
2018/0056237 A1* 3/2018 Yoshida ............. B01D 39/2027

FOREIGN PATENT DOCUMENTS

| JP | 2004-273244 A | 9/2004 |
| JP | 2009-193671 A | 8/2009 |

* cited by examiner

*Primary Examiner* — Karie O'Neill Apicella
(74) *Attorney, Agent, or Firm* — Dinsmore & Shohl LLP

(57) ABSTRACT

An air cleaner for a fuel cell vehicle includes: a case having an inlet and an outlet; and a filter element fixed to the case, the filter element being configured to section the case into an inlet side and an outlet side and filter air flowing from the inlet side to the outlet side. A locking projection projecting toward the inside of the case is provided on the inlet side in the case. A first prefilter, a second prefilter, and a chemical filter are sandwiched between the locking projection and the filter element in the order of the first prefilter, the chemical filter, and the second prefilter from the upstream side as the inlet side of the filter element inside the case toward the downstream side as the outlet side of the filter element inside the case.

4 Claims, 3 Drawing Sheets

AIR CLEANER FOR FUEL CELL VEHICLE

CROSS-REFERENCE

This application claims priority to Japanese Patent Application No. 2017-238636 filed on Dec. 13, 2017, which is incorporated herein by reference in its entirety including the specification, drawings and abstract.

BACKGROUND

1. Technical Field

The disclosure relates to an air cleaner for a fuel cell vehicle, the air cleaner being provided in an intake system for supplying air to a fuel cell stack.

2. Description of Related Art

A fuel cell stack provided in a fuel cell vehicle is generally formed such that a plurality of cells in each of which an electrode assembly is sandwiched between separators is laminated. The electrode assembly is configured such that a hydrogen electrode catalyst and an oxygen electrode catalyst are applied to the opposite surfaces of a solid polymer electrolyte membrane, respectively. However, when a catalyst using noble metals such as platinum makes contact with impurities such as dust, PM2.5 (minute particulate matter), and a molecular harmful chemical substance in air, its activity decreases. Therefore, when the air to be used as a cathode gas is supplied to the fuel cell stack without removing the impurities, the activity of the catalyst decreases. This causes such a possibility that an electrochemical reaction becomes weak and an output decreases (a power generation voltage decreases).

In the meantime, in the intake system of the engine in the related art, removal of a chemical substance in the air is not demanded. Accordingly, it is difficult to remove a molecular (gaseous) harmful chemical substance by a filter element provided in an engine air cleaner so as to remove dust and particulate matter in the air. The molecular (gaseous) harmful chemical substance causes a decrease of output of the fuel cell stack.

On this account, in the fuel cell vehicle, in order to remove a harmful chemical substance from the air to be supplied to the fuel cell stack, a chemical filter made of a catalyst, active carbon, or the like attached to a base material and configured to adsorb and remove the harmful chemical substance is provided in the intake system in the related art.

For example, Japanese Unexamined Patent Application Publication No. 2009-193671 (JP 2009-193671 A) describes an air cleaner in which a chemical filter is accommodated as a filter.

SUMMARY

In the meantime, the catalyst, active carbon, or the like attached to the base material constituting the chemical filter may fall from the base material due to vibration or intake air wind. Here, in a case of an air cleaner provided only with a chemical filter, it is difficult to catch falling substances and it is difficult to catch particulate matter that does not exhibit adsorption to the chemical filter. From these points, there is room for improvement in the air cleaner described in JP 2009-193671 A.

In the air cleaner in the related art, a filter element configured to filter air flowing from an inlet side to an outlet side is provided inside a case having an inlet and an outlet. In view of this, it is conceivable that a chemical filter is combined with the air cleaner. More specifically, it is conceivable that a chemical filter is added to an inlet side (upstream side) of the filter element inside the case.

However, the air cleaner in the related art is formed on the premise that the filter element is attached thereto. In a case where a chemical filter is added to the air cleaner, when the chemical filter is fixed firmly like the air cleaner, there is such a possibility that its structure is complicated and the cost thereof increases. In the meantime, if the fixation of the chemical filter is weak, there is such a possibility that the chemical filter vibrates to cause abnormal noise or to cause the base material of the chemical filter to abut with the filter element, so that the filter element is damaged.

Further, there is also such a possibility that relatively large foreign matter entering from the inlet abuts with the chemical filter, so that the chemical filter deforms and a pressure loss increases.

The disclosure relates to an air cleaner for a fuel cell vehicle in which a filter element is fixed inside a case and provides a technique to protect a chemical filter and fix the chemical filter inside the case without a wobble and also to restrain a decrease in output of a fuel cell stack, with a simple structure.

An air cleaner for a fuel cell vehicle, according to the disclosure, is configured such that a projection projecting toward the inside of a case is provided, and a chemical filter and protective members provided on the upstream side and the downstream side of the chemical filter are sandwiched between the projection and a filter element, so that the chemical filter is firmly fixed to the case.

More specifically, the disclosure relates to an air cleaner for a fuel cell vehicle, the air cleaner including a case and a filter element. The case has an inlet and an outlet. The filter element is fixed to the case, and configured to section the case into an inlet side and an outlet side and filter air flowing from the inlet side to the outlet side.

The air cleaner is configured such that: a locking projection projecting toward the inside of the case is provided on the inlet side in the case; and a first protective member and a second protective member each having permeability, and a chemical filter configured to adsorb a molecular substance included in the air are sandwiched between the locking projection and the filter element inside the case in an order of the first protective member, the chemical filter, and the second protective member from an upstream side that is the inlet side of the filter element inside the case toward a downstream side that is the outlet side of the filter element inside the case.

In this configuration, the locking projection projecting toward the inside of the case is provided, and the first protective member, the second protective member, and the chemical filter are sandwiched between the locking projection and the filter element fixed to the case. With such a simple configuration, the chemical filter can be fixed inside the case without a wobble. This makes it possible to restrain abnormal noise to be caused due to vibrations of the chemical filter.

Further, since the first protective member is provided on the upstream side of the chemical filter, it is possible to restrain such a situation that relatively large foreign matter entering from the inlet abuts with the chemical filter, thereby making it possible to restrain an increase of pressure loss due to deformation and the like of the chemical filter.

Further, since the second protective member is also provided between the chemical filter and the filter element, it is possible to prevent the filter element from being damaged by abutment with a base material of the chemical filter.

In addition, since the chemical filter is provided on the downstream side of the first protective member having permeability, it is possible to remove a harmful chemical substance in the air passing through the first protective member by adsorbing it by a catalyst or active carbon. Further, since the filter element is provided on the downstream side of the second protective member having permeability, particulate matter passing through the chemical filter and exhibiting no adsorption to the chemical filter, a substance falling from the chemical filter, and the like can be caught by the filter element and removed from the air. Thus, clean air is supplied to a fuel cell stack, thereby making it possible to restrain an output decrease of the fuel cell stack.

Further, in the air cleaner, the first protective member may be a prefilter for the chemical filter, and the second protective member may be a prefilter for the filter element.

With this configuration, relatively large foreign matter entering from the inlet abuts with the prefilter (the first protective member) first, so that it is possible to restrain the chemical filter from deforming. Further, dust in the air is removed to some extent by the prefilter (the first protective member), so that it is possible to restrain the chemical filter from clogging. Hereby, it is possible to further restrain an increase of pressure loss of the chemical filter.

Similarly, particulate matter and the like passing through the chemical filter are removed to some extent by the prefilter (the second protective member), so that it is possible to restrain the filter element from clogging.

Further, in the air cleaner, the case may be formed such that a case member on the inlet side is fitted to a case member on the outlet side, and the filter element may be fixed to the case such that an outer peripheral edge of the filter element is sandwiched between the case member on the inlet side and the case member on the outlet side.

With this configuration, the air cleaner can be assembled by a simple operation of setting the first protective member, the chemical filter, and the second protective member in the case member on the inlet side so as to be locked with the locking projection and sandwiching the filter element between the case member on the inlet side and the case member on the outlet side.

Further, in the air cleaner, the filter element may be a charged filter.

With this configuration, $SO_2$, $NH_3$, NOx, and the like to cause PM2.5 can be removed by the chemical filter and particulate matter such as PM2.5 can be efficiently caught by an electrostatic force of the charged filter. Hereby, it is possible to restrain an output decrease of the fuel cell stack and to restrain generation of PM2.5, thereby making it possible to contribute to cleanup of the atmospheric air.

As described above, according to the air cleaner of the present disclosure, with a simple structure, it is possible to fix the chemical filter inside the case without a wobble while the chemical filter is protected and it is also possible to restrain an output decrease of the fuel cell stack.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments for carrying out the disclosure will be described below with reference to the drawings.

Embodiment 1

Figure 1:
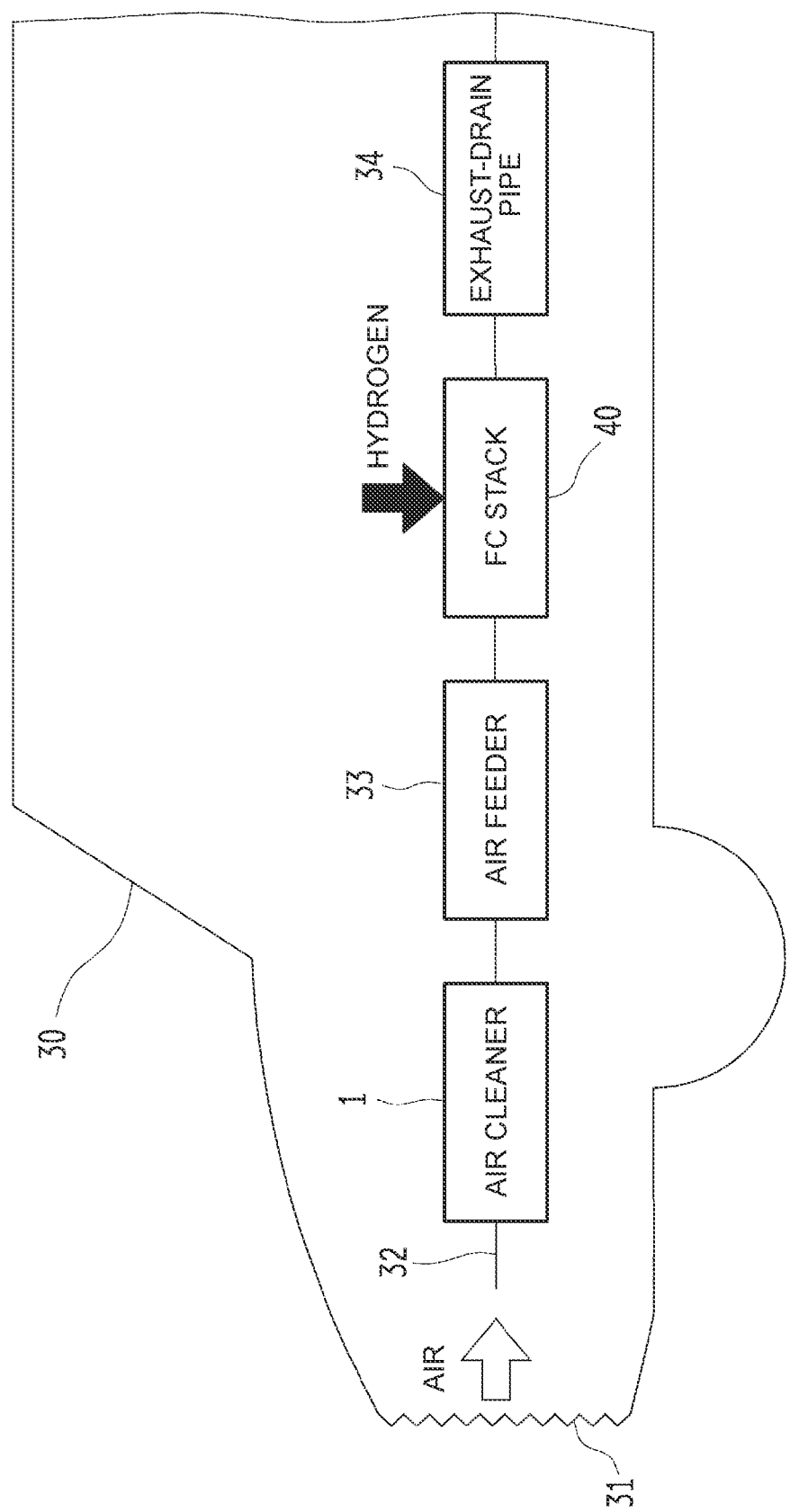
FIG. 1 is a view schematically illustrating a fuel cell system of a fuel cell vehicle according to Embodiment 1 of the disclosure.

FIG. 1 is a view schematically illustrating a fuel cell system of a fuel cell vehicle 30 according to the present embodiment. The fuel cell vehicle 30 is provided with a grill 31 on the front side in the vehicle front-rear direction as an air intake port via which external air is taken in. As indicated by a blank arrow in FIG. 1, in the fuel cell vehicle 30, the air taken in from the grill 31 is introduced into a supply pipe 32 through an air intake (not shown). The supply pipe 32 is provided with an air cleaner 1, an air feeder (air compressor) 33, and an opening/closing valve (not shown). The air cleaner 1 removes foreign matter included in the air. The air feeder (air compressor) 33 sucks external air and compresses it to a predetermined pressure so as to send the external air to the downstream side. The opening/closing valve controls entry and exit of the air as a cathode gas to a fuel cell stack (hereinafter also referred to as an FC stack) 40.

In addition to the air as the cathode gas, hydrogen as an anode gas is supplied to the FC stack 40 from a high-pressure hydrogen tank (not shown) as indicated by a black arrow in FIG. 1. The FC stack 40 is a power generator configured to generate electric energy to be supplied to a motor (not shown) or a driving battery (not shown) by use of a chemical reaction between hydrogen and oxygen in the air. The FC stack 40 is formed such that a plurality of cells in each of which an electrode assembly is sandwiched between separators is laminated. The electrode assembly is configured such that a hydrogen electrode catalyst and an oxygen electrode catalyst are applied to the opposite surfaces of a solid polymer electrolyte membrane, respectively.

Water generated by the chemical reaction between hydrogen and oxygen is discharged from the FC stack 40 to an exhaust-drain pipe 34. Further, hydrogen passing through the FC stack 40 is discharged to the exhaust-drain pipe 34 and then diluted by a dilutor (not shown) to a sufficiently low concentration, and after that, the hydrogen is discharged outside.

In the meantime, when a catalyst using noble metals such as platinum and used for the FC stack 40 makes contact with impurities such as dust, PM2.5, and a harmful chemical substance in the air, its activity decreases. Therefore, if the air used as the cathode gas is supplied to the FC stack 40 without removing the impurities, the activity of the catalyst decreases, so that an electrochemical reaction becomes weak and an output decreases.

In view of this, in the present embodiment, a filter element 2 configured to remove dust and particulate matter is provided in the air cleaner 1, as will be described below. Further, in the present embodiment, in order to remove a molecular (gaseous) harmful chemical substance and the like from the air supplied to the FC stack 40, a chemical filter 3 configured to adsorb and remove the harmful chemical substance and the like is added to the air cleaner 1.

Figure 2:
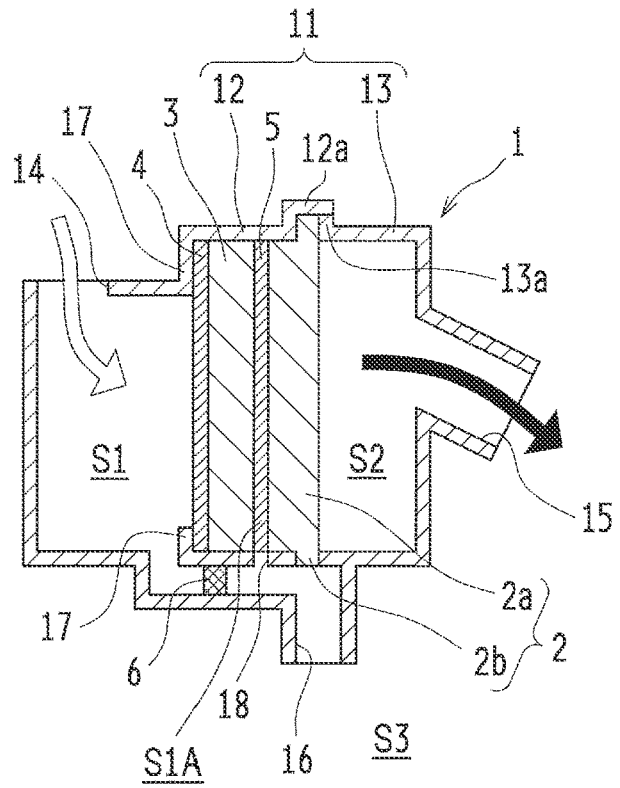
FIG. 2 is a sectional view schematically illustrating an air cleaner for a fuel cell vehicle.

FIG. 2 is a sectional view schematically illustrating the air cleaner 1 for a fuel cell vehicle. The air cleaner 1 includes an air cleaner case 11 having an inlet 14 and an outlet 15, the filter element 2, a first prefilter 4, a second prefilter 5, and the chemical filter 3.

The air cleaner case 1 has a two-compartment structure constituted by a resin inlet-side case member 12 in which the inlet 14 is formed, and a resin outlet-side case member 13 in which the outlet 15 is formed. The air cleaner case 11 is formed in a rectangular tubular shape such that a fitting portion 12a formed in the inlet-side case member 12 is fitted to a fitting portion 13a formed in the outlet-side case member 13. A supply pipe 32 is connected to the inlet 14, so that the air taken in from the grill 31 is introduced. In the meantime, the supply pipe 32 is connected to the outlet 15, so that the air passing through the air cleaner case 11 is sent out. The inlet-side case member 12 includes a locking projection 17 projecting toward the inside of the air cleaner case 11 such that the locking projection 17 is provided on a side closer to the inlet 14 than the fitting portion 12a and formed over the whole circumference of the rectangular shape.

Further, a bypass path 16 via which the inside of the air cleaner case 11 communicates with an external space S3 is formed in the air cleaner case 11. Hereby, the air in a motor room where the air cleaner 1 is placed can be introduced. The bypass path 16 communicates with an inlet-side space S (described later) on the side closer to the inlet 14 than the locking projection 17. Further, the bypass path 16 also communicates with the inlet-side space S1 on a side closer to the outlet 15 than the locking projection 17 via an opening 18 formed in the inlet-side case member 12. In fact, as illustrated in FIG. 1, the bypass path 16 is stuffed with a sealing member 6 (a rubber lip, a urethane sponge, and the like) so that the communication with the inlet-side space S1 on the side closer to the inlet 14 than the locking projection 17 is blocked. Accordingly, the bypass path 16 communicates with the inlet-side space S1 only via the opening 18.

The filter element 2 includes a rectangular filter medium 2a, and a sealing member 2b provided on the outer periphery of the filter medium 2a so as to constitute an outer peripheral edge of the filter element 2. The filter medium 2a is formed such that fine-weave filter-paper or nonwoven fabric is folded into pleats. The filter element 2 is firmly fixed to the air cleaner case 11 such that the outer peripheral edge (the sealing member 2b) is sandwiched between the fitting portion 12a of the inlet-side case member 12 and the fitting portion 13a of the outlet-side case member 13, so that the filter element 2 seals a gap between the inlet-side case member 12 and the outlet-side case member 13. The filter element 2 is provided inside the air cleaner case 11 as such, and hereby, the filter element 2 sections the air cleaner case 11 into the space S1 on the inlet 14 side (the upstream side) and a space S2 on the outlet 15 side (the downstream side) and filters the air flowing from the inlet 14 side to the outlet 15 side so as to remove dust and particulate matter from the air.

The first prefilter (a first protective member) 4 and the second prefilter (a second protective member) S are each constituted by a coarse porous material such as nonwoven fabric. In the meantimne, the chemical filter 3 is configured such that active carbon to which $MnO_2$ and alkali are attached is carried by an aluminum material having a honeycomb structure (hereinafter referred to as aluminum honeycomb), and decomposes and removes $SO_2$, $NH_3$, $NOx$, and so on by adsorbing them. Here, $SO_2$, $NH_3$, $NOx$, and so on are factors to cause a chemical substance harmful to the FC stack 40, and PM2.5. A rectangular urethane frame (not shown) is provided in an outer periphery of the aluminum honeycomb.

As illustrated in FIG. 2, the first prefilter 4, the second prefilter 5, and the chemical filter 3 are fixed inside the air cleaner case 11 such that the first prefilter 4, the second prefilter 5, and the chemical filter 3 are sandwiched between the locking projection 17 and the filter element 2 in the order of the first prefilter 4, the chemical filter 3, and the second prefilter 5 from the upstream side that is the inlet side of the filter element inside the case toward the downstream side that is the outlet side of the filter element inside the case.

More specifically, when the first prefilter 4, the second prefilter 5, and the chemical filter 3 are set up inside the air cleaner case 11, the chemical filter 3 is sandwiched between the first prefilter 4 and the second prefilter 5 first. In this state, the urethane frame for the chemical filter 3 is fitted into the inlet-side case member 12, and the first prefilter 4, the chemical filter 3, and the second prefilter 5 are pushed therein until the first prefilter 4 abuts with the locking projection 17. As such, in the present embodiment, the setup operation can be performed in a state where the chemical filter 3 is sandwiched between the first prefilter 4 and the second prefilter 5. In other words, the fitting operation can be performed without directly touching the chemical filter 3. This makes it possible to prevent such a situation that the aluminum honeycomb deforms or an operator gets hurt by touching the aluminum honeycomb.

Further, the filter element 2 is fitted into the inlet-side case member 12 to which the first prefilter 4, the chemical filter 3, and the second prefilter 5 are fitted, and the sealing member 2b of the filter element 2 is sandwiched between the fitting portion 12a of the inlet-side case member 12 and the fitting portion 13a of the outlet-side case member 13. Thus, the filter element 2 is fixed to the air cleaner case 11. Hereby, the first prefilter 4, the chemical filter 3, and the second prefilter 5 are fixed to the air cleaner case 11 in a state where they are sandwiched between the locking projection 17 and the filter element 2.

In the air cleaner 1 configured as such, with such a simple configuration that the first prefilter 4, the chemical filter 3, and the second prefilter 5 are sandwiched between the locking projection 17 and the filter element 2 fixed to the air cleaner case 11, the chemical filter 3 can be fixed inside the air cleaner case 11 without a wobble. Hereby, without employing a complicated structure for fixing the chemical filter 3, it is possible to restrain abnormal noise to be caused due to vibrations of the chemical filter 3.

Further, since the first prefilter 4 is provided on the upstream side of the chemical filter 3, it is possible to prevent such a situation that relatively large foreign matter entering from the inlet 14 abuts with the chemical filter 3. Hereby, for example, it is possible to prevent such a situation that the chemical filter 3 deforms because pebbles and the like taken in with the air abut with the chemical filter 3 or the chemical filter 3 is clogged because a leaf and the like taken in with the air are stuck on the chemical filter 3. Accordingly, it is possible to prevent an increase in pressure loss of the chemical filter 3.

Further, the second prefilter 5 is provided between the chemical filter 3 and the filter element 2. Hereby, it is possible to prevent the filter element 2 made of filter paper or the like from being damaged by contact with the chemical filter 3 made of the aluminum honeycomb.

In addition, the chemical filter 3 is provided on the downstream side of the first prefilter 4 having permeability. Hereby, it is possible to remove a harmful chemical substance in the air passing through the first prefilter 4 by adsorbing it by active carbon.

Further, the filter element 2 is provided on the downstream side of the second prefilter 5 having permeability. Hereby, particulate matter passing through the chemical filter 3 and exhibiting no adsorption to the chemical filter 3, a substance falling from the chemical filter 3, and the like can be caught by the filter element 2 and removed from the air. Thus, clean air is supplied to the fuel cell stack 40, thereby making it possible to restrain an output decrease of the fuel cell stack 40.

Note that, when the fuel cell vehicle 30 is driven during snow fall, snow 50 (see FIG. 3) is taken into the air cleaner 1 with the air, so that the filter element 2 may be blocked or clogged by the snow 50 accumulated in the air cleaner 1. This might stop power generation, thereby making it difficult to continue the running of the fuel cell vehicle 30. However, in the present embodiment, by providing the bypass path 16 in the air cleaner 1 as described above, it is possible to continue the running of the fuel cell vehicle 30 as will be described below.

Figure 3:
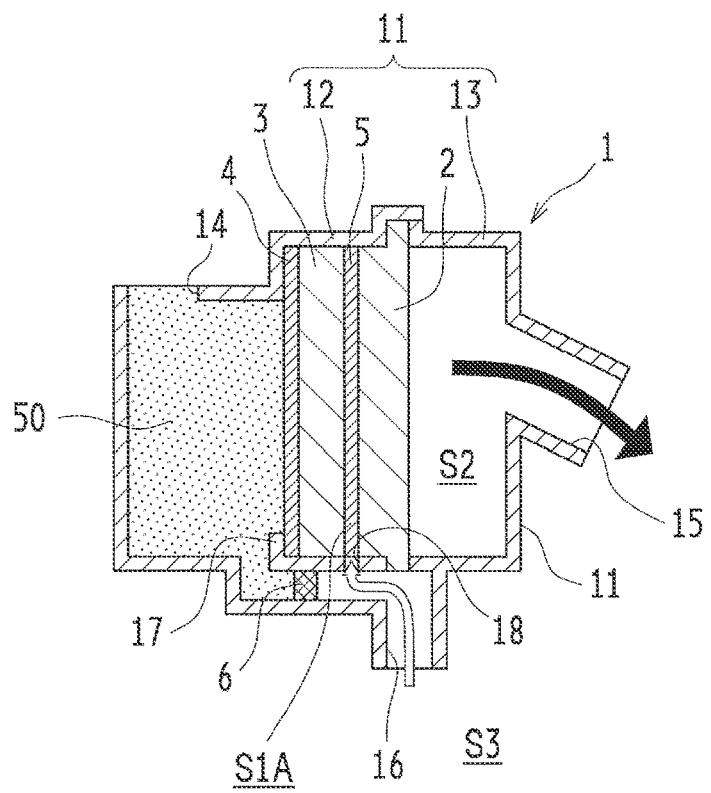
FIG. 3 is a sectional view to describe a flow of air when snow is deposited inside the air cleaner.

FIG. 3 is a sectional view to describe a flow of the air when the snow 50 is deposited inside the air cleaner 1. As illustrated in FIG. 3, when the snow 50 taken in with the air is deposited inside the air cleaner case 11, it is difficult to take in the air from the inlet 14 (see a cross mark in FIG. 3). However, since the snow 50 is dammed up by the first prefilter 4 and the chemical filter 3 provided on the upstream side from the filter element 2, the filter element 2 itself is not blocked up by the snow 50. Thus, in the air cleaner case 11, the bypass path 16 via which a space S1A between the chemical filter 3 and the filter element 2 communicates with the external space S3 outside the air cleaner case 11 is formed. Hereby even in a case where it is difficult to take in the air from the inlet 14 due to the snow 50 deposited in the air cleaner case 11, it is possible to take in the air in the motor room via the bypass path 16. Note that the bypass path 16 is stuffed with the sealing member 6, so that the communication with the inlet-side space S1 on the side closer to the inlet 14 than the locking projection 17 is blocked. Accordingly, the bypass path 16 is not blocked by the snow 50 deposited inside the air cleaner case 11.

Thus, the air in the external space S3 where the snow 50, a pebble, and the like are not included is taken in by the air compressor. The air is introduced from the bypass path 16 as indicated by a blank arrow in FIG. 3, so as to reach the space S1A between the chemical filter 3 and the filter element 2 through the opening 18, and then, the air passes through the second prefilter 5 provided in the space S1A. After that, dust, particulate matter, and the like are removed from the air by the filter element 2, so that the air is sent out from the outlet 15 to the supply pipe 32, as indicated by a black arrow in FIG. 3.

As such, with the air cleaner 1 of the present embodiment, even when the snow 50 taken in with the air is deposited inside the air cleaner case 11, clean air from which foreign matter is removed is supplied to the fuel cell stack. This accordingly makes it possible to restrain power generation from being stopped, thereby making it possible to continue the running of the fuel cell vehicle.

Embodiment 2

The present embodiment is different from Embodiment 1 in that a filter element of an air cleaner 21 is a charged filter 22. The following mainly describes differences from Embodiment 1.

Figure 4:
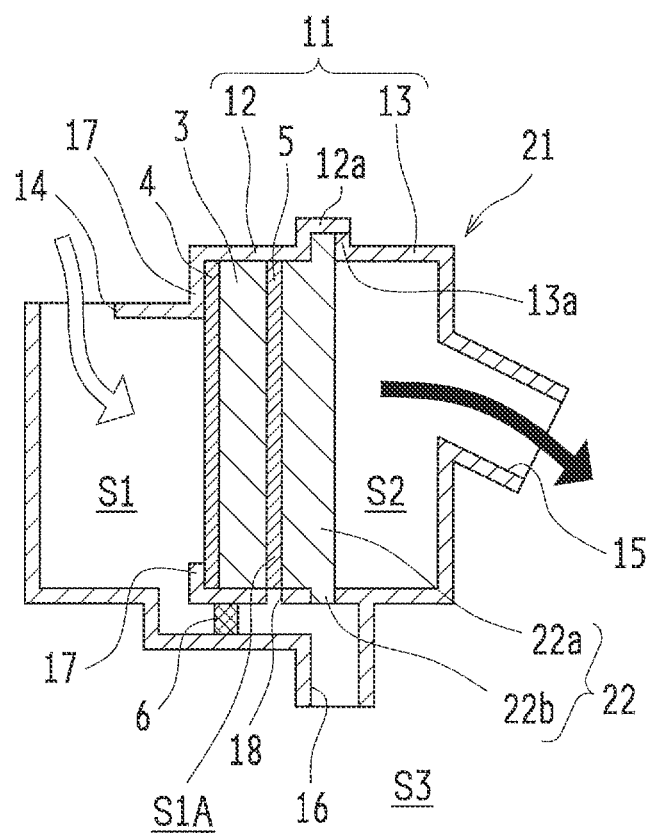
FIG. 4 is a sectional view schematically illustrating an air cleaner for a fuel cell vehicle according to Embodiment 2 of the disclosure.

FIG. 4 is a sectional view schematically illustrating the air cleaner 21 for a fuel cell vehicle according to the present embodiment. The air cleaner 21 is provided with the first prefilter 4, the chemical filter 3, the second prefilter 5, and the charged filter 22 sequentially from the upstream side.

The charged filter 22 includes a rectangular filter medium 22a, and a sealing member 22b provided on the outer periphery of the filter medium 22a so as to constitute an outer peripheral edge of the charged filter 22. The filter medium 22a is formed such that a resin nonwoven fabric layer attached to fine-weave filter paper is subjected to electret processing and then folded into pleats. The charged filter 22 removes dust and particulate matter from the air, similarly to the filter element 2 of Embodiment 1. Further, unlike the filter element 2 of Embodiment 1, by performing the electret processing, minute particulate matter such as PM2.5 is efficiently caught by an electrostatic force.

As illustrated in FIG. 4, the charged filter 22 is firmly fixed to the air cleaner case 11 such that the outer peripheral edge (the sealing member 22b) is sandwiched between the fitting portion 12a of the inlet-side case member 12 and the fitting portion 13a of the outlet-side case member 13, so that the charged filter 22 seals the gap between the inlet-side case member 12 and the outlet-side case member 13.

The air cleaner 21 configured as such is provided with the chemical filter 3 on the downstream side of the first prefilter 4 having permeability, so that it is possible to remove $SO_2$, $NH_3$, NOx, and the like that cause a harmful chemical substance and PM2.5 in the air passing through the first prefilter 4, by adsorbing them by active carbon.

Further, the charged filter 22 is provided on the downstream side of the second prefilter 5 having permeability. Hereby, particulate matter passing through the chemical filter 3 and exhibiting no adsorption to the chemical filter 3 and a substance falling from the chemical filter 3 can be removed, and further, PM2.5 can be also adsorbed by an electrostatic force of the charged filter 22. Thus, clean air is supplied to the fuel cell stack 40, so that it is possible to restrain an output decrease of the fuel cell stack 40 and to restrain generation of PM2.5, thereby making it possible to contribute to cleanup of the atmospheric air.

OTHER EMBODIMENTS

The disclosure is not limited to the embodiments and can be performed in other various forms without departing from the spirit or main feature thereof.

In each of the above embodiments, the first prefilter 4 and the second prefilter 5 are used as the first protective member and the second protective member. However, the first protective member and the second protective member are not limited to them, provided that they have permeability and can protect the chemical filter 3, the filter element 2, and the charged filter 22. As the first protective member and the second protective member, a mesh member or the like that does not have an air filtering function but can catch relatively large foreign matter such as a pebble may be used.

Thus, the above embodiments are just examples in every respect and should not be interpreted restrictively. Further, modifications and alterations within a range equivalent to the scope of claims are all included in the disclosure.

According to the disclosure, with a simple structure, a chemical filter is fixed inside a case without a wobble while the chemical filter is protected, and an output decrease of a fuel cell stack can be restrained. Accordingly, the disclosure is extremely useful when the disclosure is applied to an air cleaner for a fuel cell vehicle, the air cleaner being configured such that a filter element is fixed inside a case.

What is claimed is:

1. An air cleaner for a fuel cell vehicle, the air cleaner comprising:
   a case having an inlet and an outlet; and
   a filter element fixed to the case, the filter element being configured to section the case into an inlet side and an outlet side and filter air flowing from the inlet side to the outlet side, wherein:
   a locking projection projecting toward an inside of the case is provided on the inlet side in the case; and
   a first protective member and a second protective member each having permeability, and a chemical filter configured to adsorb a molecular substance included in the air are sandwiched between the locking projection and the filter element inside the case in an order of the first protective member, the chemical filter, and the second protective member from an upstream side that is the inlet side of the filter element inside the case toward a downstream side that is the outlet side of the filter element inside the case.

2. The air cleaner according to claim 1, wherein:
   the first protective member is a prefilter for the chemical filter; and
   the second protective member is a prefilter for the filter element.

3. The air cleaner according to claim 1, wherein:
   the case is formed such that a case member on the inlet side is fitted to a case member on the outlet side; and
   the filter element is fixed to the case such that an outer peripheral edge of the filter element is sandwiched between the case member on the inlet side and the case member on the outlet side.

4. The air cleaner according to claim 1, wherein the filter element is a charged filter.

* * * * *

UNITED STATES PATENT AND TRADEMARK OFFICE
CERTIFICATE OF CORRECTION

Page 1 of 1

PATENT NO. : 10,868,319 B2
APPLICATION NO. : 16/196761
DATED : December 15, 2020
INVENTOR(S) : Tetsuya Ichikawa et al.

It is certified that error appears in the above-identified patent and that said Letters Patent is hereby corrected as shown below:

On the Title Page

Item (71), applicant 1, city, delete "Toyota" and insert --Toyota-shi Aichi-ken--, therefor.

Item (71), applicant 2, city, delete "Kariya" and insert --Kariya-shi Aichi-ken--, therefor.

Item (72), Inventor 1, city, delete "Toyota" and insert --Toyota-shi Aichi-ken--, therefor.

Item (72), Inventor 2, city, delete "Nagoya" and insert --Nagoya-shi Aichi-ken--, therefor.

Item (72), Inventor 3, city, delete "Kariya" and insert --Kariya-shi Aichi-ken--, therefor.

Item (72), Inventor 4, city, delete "Obu" and insert --Obu-shi Aichi-ken--, therefor.

Item (72), Inventor 5, city, delete "Kariya" and insert --Kariya-shi Aichi-ken--, therefor.

Item (73), assignee 1, city, delete "Toyota" and insert --Toyota-shi Aichi-ken--, therefor.

Item (73), assignee 2, city, delete "Kariya" and insert --Kariya-shi Aichi-ken--, therefor.

In the Specification

In Column 5, Line(s) 31, before "(described later)", delete "S" and insert --S1--, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*